United States Patent [19]

Hilakos

[11] Patent Number: 4,939,002

[45] Date of Patent: Jul. 3, 1990

[54] POLTRUSION APPARATUS AND METHOD FOR IMPREGNATING CONTINUOUS LENGTHS OF MULTI-FILAMENT AND MULTI-FIBER STRUCTURES

[75] Inventor: William Hilakos, Mt. Vernon, Ind.

[73] Assignee: General Electric Company, Mt. Vernon, Ind.

[21] Appl. No.: 133,417

[22] Filed: Dec. 15, 1987

[51] Int. Cl.$^5$ ............................................. B05D 1/18
[52] U.S. Cl. .................................... 427/434.4; 118/44; 118/405; 118/428; 118/DIG. 18; 156/180; 156/245; 156/441; 264/136; 264/174; 425/93; 425/114; 427/434.6
[58] Field of Search ................ 118/428, 404, 405, 44, 118/DIG. 18; 156/180, 181, 441, 245; 264/136, 137, 257, 174; 425/114, 102, 93, 113; 427/434.4, 434.6

[56] References Cited

U.S. PATENT DOCUMENTS

| | | | |
|---|---|---|---|
| 2,730,455 | 1/1956 | Swann | 118/304 X |
| 3,148,102 | 9/1964 | Eakins et al. | 156/181 |
| 3,413,186 | 11/1968 | Marzocchi | 156/148 |
| 3,473,511 | 10/1969 | Metz et al. | 118/428 X |
| 3,503,371 | 3/1970 | Meyers et al. | 118/405 |
| 3,703,396 | 11/1972 | Lamanche et al. | 156/180 X |
| 3,779,844 | 12/1973 | Dorsch | 118/420 X |
| 3,798,095 | 3/1974 | Hall | 156/73.6 |
| 4,289,558 | 9/1981 | Eichenbaum et al. | 156/180 X |
| 4,305,770 | 12/1981 | Stiles | 156/180 |
| 4,312,917 | 1/1982 | Hawley | 156/296 X |
| 4,713,139 | 12/1987 | Ganga | 425/113 X |
| 4,728,387 | 3/1988 | Hilakos | 156/180 X |

Primary Examiner—Shrive Beck
Assistant Examiner—Alain Bashore
Attorney, Agent, or Firm—Martin B. Barancik; Joseph T. Eisele

[57] ABSTRACT

Apparatus and method for the impregnation of a continuous length of multifilament or multifiber yarns with a molten thermoplastic polymeric resin includes a member for spreading the multifilaments or multifibers apart during their immersion in a bath of the molten resin. The shape, configuration and location of the member facilitates the homogeneous impregnation, particularly with highly viscous melts, to produce a uniform and thorough encapsulation of the filaments or fibers.

8 Claims, 2 Drawing Sheets

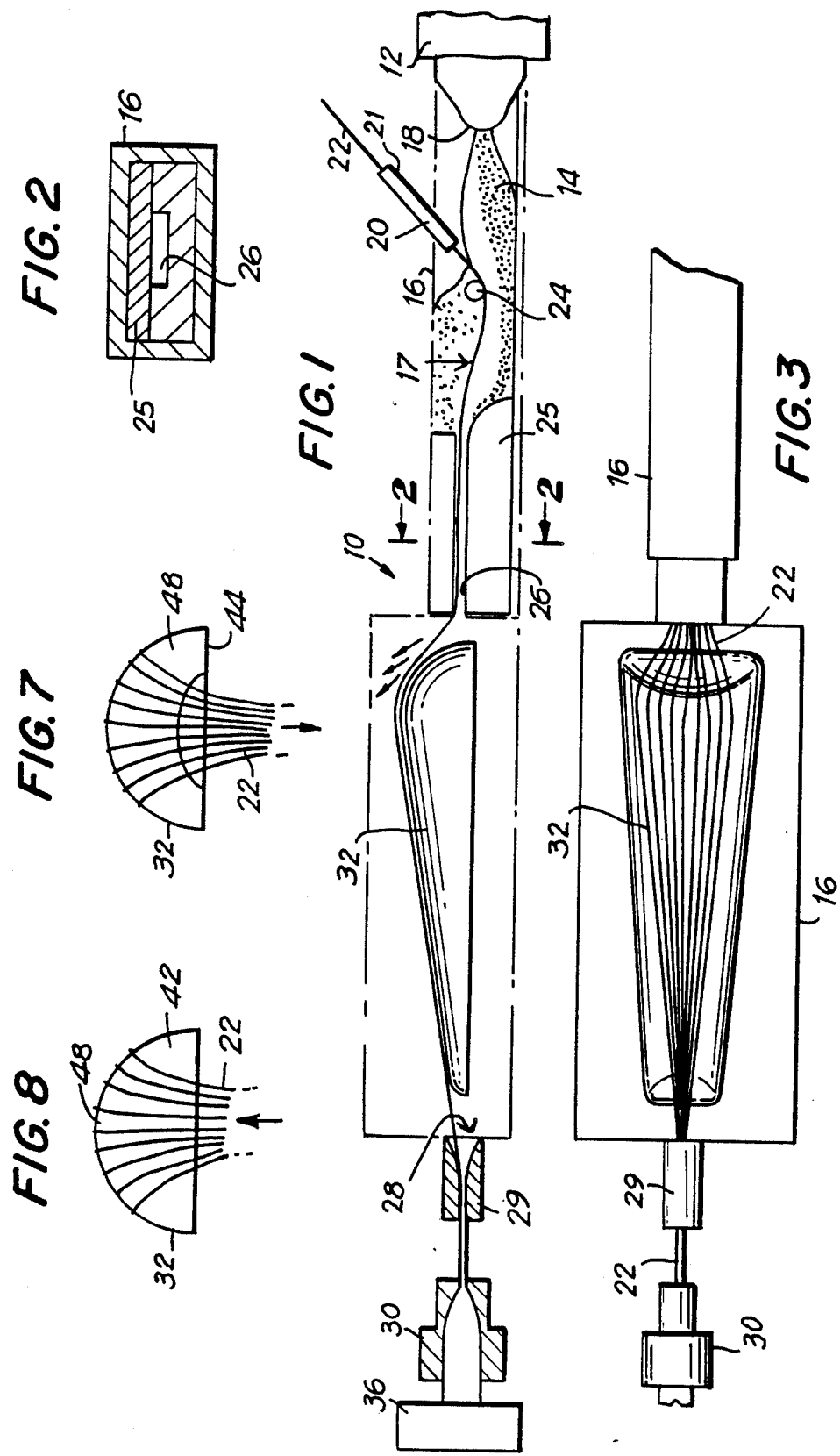

POLTRUSION APPARATUS AND METHOD FOR IMPREGNATING CONTINUOUS LENGTHS OF MULTI-FILAMENT AND MULTI-FIBER STRUCTURES

BACKGROUND OF THE INVENTION

1. Field of the Invention

The invention relates to methods and apparatus for impregnating continuous lengths of fiber and filament structures such as yarns, with polymeric resins.

BRIEF DESCRIPTION OF THE PRIOR ART

A wide variety of methods and devices have been proposed for impregnating yarns and like structures composed of textile fibers and/or filaments with polymeric resins; see for example the U.S. Pat. No. 3,413,186 which describes the impregnation of yarns of glass fibers. In general, one of the problems faced by the artisan has been the achievement of a product wherein the multitude of individual filaments or fibers such as glass fibers is completely wetted and encapsulated with the resin impregnant so as to eliminate air pockets or voids between fibers. Unless this is accomplished, the resin will be insufficiently reinforced, thereby leading to lower than expected strength as indicated by modulus measurements. This of course leads to a reduced life for the structure made up of the filaments or fibers. The problem is especially difficult when the polymeric resin is a relatively viscous thermoplastic resin of a desirably high inherent viscosity.

Another problem of the prior art relates to effecting a spreading of the fibers or filaments from each other so that the impregnant can thoroughly "wet" and encapsulate the individual fibers or filaments. The prior art is replete with descriptions of methods and apparatus having an objective of solving this particular aspect of the above-described problems. Representative of such descriptions are those found in the U.S. Pat. No. 2,730,455 to Swann, concerning filament separation by an electrostatic force; U.S. Pat. No. 3,413,186 to Marcoccli where elements are provided to flex and bend the multi-filament or fiber length during its residence in an impregnating fluid; U.S. Pat. No. 3,422,796 to Baber which describes the mechanical separation of multifilaments on a grooved surface; U.S. Pat. No. 3,779,844 to Dorsch who employed vibrators to effect the desired separation; U.S. Pat. No. 3,798,095 to Hall who employed acoustic vibrations; U.S. Pat. No. 4,312,917 to Hawley who in an effort to simplify apparatus merely inserted lobes in the path of the multifilament length during its contact with the impregnant; and U.S. Pat. No. 4,541,884 to Cogswell et al. which describes the use of series of rods which function as "spreader surfaces". The latter patent is particularly noteworthy because it describes a method and apparatus having a purpose to solve one of the problems solved by the present invention, i.e.; the uniform and thorough impregnation of a continuous length of a multifilament yarn with a relatively high molecular weight, relatively viscous polymeric resin. However, the improvements noted by Cogswell et al. are not entirely related to the apparatus, but are also dependent on the use of a volatile plasticizer in admixture with the thermoplastic resin. Such a condition is not always acceptable to the artisan who may be severely restricted by the environmental impact of disposal of the volatilized plasticizer. Also, the presence of a plasticizer in certain proportions may be degradative of the resin.

Also of interest for its representation of the state of the art, is the description given in the U.S. Pat. No. 3,694,131.

The apparatus and the method of the present invention provides a simplified means of completely wetting and impregnating a continuous length of multifilament or multifibered yarns with a thermoplastic polymeric resin of both relatively high and relatively low viscosity.

SUMMARY OF THE INVENTION

The invention comprises poltrusion apparatus for impregnating a continuous length of multifilaments or multifibers, which comprises;

(A.) a thermoplastic polymeric resin extruder;

(B.) vessel means positioned adjacent to the extruder, for receiving and containing thermoplastically extruded polymeric resin, said vessel means having (i) a first inlet for receiving the extruded resin;

(ii) a second inlet for receiving into contained resin, the continuous length for impregnation; and (iii) an outlet for the impregnated continuous length;

(C.) a sizing die on the vessel means outlet;

(D.) means adjacent to the sizing die, for tensioning the continuous length and tracting the tensioned continuous length along a predetermined path into the second inlet, through the vessel means, through the outlet and through the sizing die;

(E.) a multifilament or multifiber spreading member positioned within the vessel means, between the second inlet and the outlet, said member comprising an elongate body having (i) a first end adjacent to the second inlet;

(ii) a second end adjacent to the outlet; and (iii) a multifilament or multifiber spreading surface between the first and second ends;

said body also having a taper beginning at the first end and terminating at the second end;

said body being further defined by a shape characterized in part by (i) a first curvilinear line, when the body is viewed in cross-section along a plane perpendicular to the lengthwise axis of its elongate body, with a point on the line between the ends of the line;

(ii) a second curvilinear line, when the body is viewed in cross-section along a plane parallel to the lengthwise axis of the elongate body, with a point on the second line between the first and second ends;

said member being aligned between the second inlet and the outlet so that a portion of the multifilament or multifiber spreading surface, including the points on the first and second curvilinear lines, lies on the predetermined path.

The invention also comprises a method of impregnating continuous lengths of multifilament or multifiber yarns, employing the apparatus of the invention.

The term "poltrusion" as used herein is a coined term for a reinforced plastics technique in which continuous strands of resin-impregnated reinforcing material are pulled through the orifice of a die. The process yields continuous lengths of material with high unidirectional strengths, used for building siding, fishing rods, pipe, golf club shafts, moldable tapes and like articles.

By the term "continuous length of multifilaments or multifibers" we mean any fibrous or filamentous structure such as a yarn, in which the fibers/filaments are sufficiently long to give a roving, tow or yarn of sufficient strength, under the processing conditions described hereinafter, to be poltruded through a molten thermoplastic polymer resin and a sizing die without such a frequency of breakage as to render the impregnated length unusable.

BRIEF DESCRIPTION OF THE DRAWINGS

FIG. 1 is a side view of an embodiment apparatus of the invention, partially disassembled and partially cut away, shown in operation.

FIG. 2 is a view along lines 2—2 of FIG. 1.

FIG. 3 is a view as in FIG. 1 but from above the embodiment apparatus.

FIG. 7 is a view as in FIG. 6, with a continuous length of multifilaments being spread on the upper surface.

FIG. 8 is a view as in FIG. 7 but of the opposite end of the multifilament spreading member.

DETAILED DESCRIPTION OF THE PREFERRED EMBODIMENTS OF THE INVENTION

Figure 5:
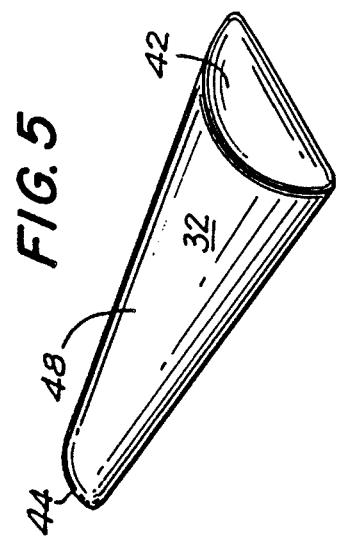
FIG. 5 is a view-in perspective of the multifilament spreading member shown in FIG. 4, removed from the apparatus vessel means.

The method and apparatus of the invention may be used to impregnate a wide variety of multifilament and multifiber structures in continuous lengths. Representative of such structures are multifilament or multifiber lengths of glass, carbon, jute, and of synthetic polymeric resins such as polyester, polyolefin, polyamide, aramid and like resins fabricated into, for example, multifilament or multifibered yarns or threads. The method and apparatus of the invention are particularly useful to impregnate continuous lengths of glass fibers, and the following description will be directed to that embodiment as representative of materials which may be subjected to the method of the invention.

The term "glass fibers" is used herein to mean fibers of a glass composition in the form of filaments, strands, yarns, bundles, cords and the like; said fibers including cut, chopped or discontinuous fiber length as well as continuous filaments. The continuous lengths of glass fibers impregnated in accordance with the present invention may be untreated or treated with anchoring agents or the like to improve bonding to the polymeric resin impregnants.

The apparatus of the invention may be used to homogeneously impregnate glass fibers (or other fibers and filaments as previously described) structured in a continuous length, with a wide variety of polymeric resins such as synthetic and natural resin elastomers, thermosetting resins and synthetic, thermoplastic polymeric resins such as polyolefins, polyurethanes, polyamides, polyesters, polycarbonates and the like. Resin forming compositions may also be impregnated into the glass fibers and the resins formed in-situ by known methods. For example, polyurethane elastomer precursors (a polyisocyanate and a polyol or a polyurethane prepolymer) together with a reaction catalyst and/or an extender may be impregnated into a glass strand structure and curing allowed to occur for the in-situ formation of a polyurethane impregnant. The in-situ preparation of such elastomers is well known; see for example the U.S. Pat. No. 4,008,197. The apparatus of the invention is particularly useful to impregnate glass fibers with thermoplastic resins, under sufficient heat to liquify (thermoplasticize) the resin.

The method and the apparatus may be used to impregnate continuous lengths of multifilaments and multifibers with relatively low viscosity materials, which may then be subjected to a treatment resulting in polymerization to obtain a hardened or cured impregnant.

Although a wide variety of low viscosity oligomer and prepolymer resin compositions are known, including but not limited to prepolymers of polyolefins, polyurethanes and the like, a preferred use is made of a reactive polycarbonate oligomer such as a cyclic carbonate. Such oligomers are well known as is the method of their preparation; see for example U.S. Pat. No. 4,644,053 which is hereby incorporated herein by reference thereto.

The term "low viscosity" generally means an intrinsic viscosity below about 0.40 dl/g as measured in methylene chloride at a temperature of 25° C. (for a polycarbonate) or an equal melt viscosity for other prepolymer compositions.

As mentioned above, the method and apparatus of the invention are particularly advantageous for impregnating continuous lengths of glass fibers with relatively high viscosity, molten resins such as polycarbonate resins. The term "high viscosity" generally means an intrinsic viscosity between about 0.4–0.5 dl/g as measured in methylene chloride at a temperature of 25° C. (for a polycarbonate) or an equal melt viscosity for other polymers.

Those skilled in the art will gain an appreciation of the invention from a reading of the following description of the preferred embodiments, in conjunction with a viewing of the accompanying drawings of FIGS. 1–8 inclusive.

FIG. 1 is a schematic side-view of an embodiment apparatus 10 of the invention, partially disassembled and partially cut away to show its operation. The apparatus 10 comprises a thermoplastic polymeric resin extruder 12 (shown in part) which may be any conventional extruder commonly employed to extrude a stream of molten (thermoplasticized) thermoplastic resin 14 as shown in the FIG. 1. The molten resin 14 is discharged or extruded directly into a vessel means 16 positioned in close proximity to the extruder 12 for receiving and containing the thermoplastically extruded polymeric resin 14. The vessel means 16 which is substantially closed to the atmosphere includes a resin containing chamber 17 and a first inlet 18 to the chamber 17 for receiving the extruded resin 14 from the extruder 12. A second inlet 20 into chamber 17 functions to receive into the contained molten resin 14, a continuous length 22 of multifilament or multifiber for impregnation. The inlet 20 may include a shaping die 21 for flattening a normally round length 22 before its entry into the chamber 17. The continuous length 22 received within chamber 17 of vessel means 16 is immersed in the contained molten resin 14 which substantially fills chamber 17 of vessel 16 by passage under a cylinder bar 24 positioned beneath the surface of the contained molten resin 14. The submerged length 22 passes then through a layering sleeve 25 positioned in chamber 17 to confine the length 22 within a relatively narrow channel 26, of a shape corresponding to the flattened (tape-like) configuration of the length 22. At a site distal to the inlet 20 and adjacent to an outlet 28, within the vessel means 16 there is a multifilament or multifiber spreading member 32 which will be described more fully hereinafter. Suffice it to say at this time that the continuous length 22 passes over the upper surface of the spreading member 32 (see arrows in FIG. 1) and on outward of the outlet 28 and through a sizing die 29. The sizing die 29 functions to wipe excess molten resin from the continuous length 22 and to size the impregnated strand or length 22 to any desired dimension by selection of a die 29 orifice to meet the operator's desire. Dies 29 may also be selected to shape the impregnated continuous length 22, for example into flat tape or into a round yarn or other shape. A preferred sizing/shaping die is described in the copending U.S. patent application Ser. No. 133,404 now U.S. Pat. No. 4,778,367 filed on the same date as this application. Alternatively, as shown in FIG. 1, a shaping die 30 may follow die 29. A traction means 36 situated beyond the sizing die 29 and shaping die 30 places tension on the continuous length 22 during its passage through the vessel means 16 and the sizing die 29 while tracting the continuous length 22 through the apparatus 10 as shown in the FIG. 1. The traction means 36 may be any commonly employed in the art to poltrude an impregnated length, such as a pair of Godet rollers.

The FIG. 2 is a view along lines 2—2 of FIG. 1 and shows further details of the layering sleeve 25.

Referring to the FIG. 3 now, one may view a representation as seen in FIG. 1, but from above, of the embodiment apparatus of the invention. As shown in FIG. 3, the continuous length 22 of multifilaments or multifibers is spread apart during its initial passage over the surface of the spreading member 32. This spreading apart of the filaments or fibers facilitates impregnation of the molten resin 14 between the multifilaments or multifibers so that a complete wetting and encapsulation of these filaments or fibers is obtained at the site of the spreading member 32. Immediately before leaving the surface of the spreading member 32, the spread apart multifilaments or multifibers are again consolidated for passage through the sizing die 29. The conditions which bring about this spreading and consolidation will be described more fully hereinafter.

Before leaving the drawings of FIGS. 1-3, it should be observed that the preferred embodiment apparatus 10 includes a moveable layering sleeve 25 positioned in the chamber 17 of vessel means 16 immediately prior to or on the upstream side of the spreading member 32. The layering sleeve 25 flattens the continuous length as it passes through the sleeve and can be moved forward or backward, or turned to adjust the distance and angle that the exiting continuous length 22 approaches the spreading member 32. As the continuous length 22 travels through the layering sleeve 25, the length 22 is forced to the top of the passage 26 traversing the sleeve 25 of the contained molten resin 14 by the path followed by length 22 so that a molten resin deposit on the bottom of the length 22 is assured, as it leaves the layering sleeve 25. The passage 26 traversing the body of the sleeve 25 being submerged below the surface of the molten resin 14 is filled with the molten resin 14 and the transitory continuous length 22. This deposit of molten resin 14 on the lower surface of the continuous length 22 is subsequently forced upward through the continuous length 22 as it then passes over the top surface of the spreading member 32. This force, in combination with the spreading affected by the spreading member 32 produces a high degree of resin penetration between filaments or fibers and into the continuous length 22.

Figure 4:
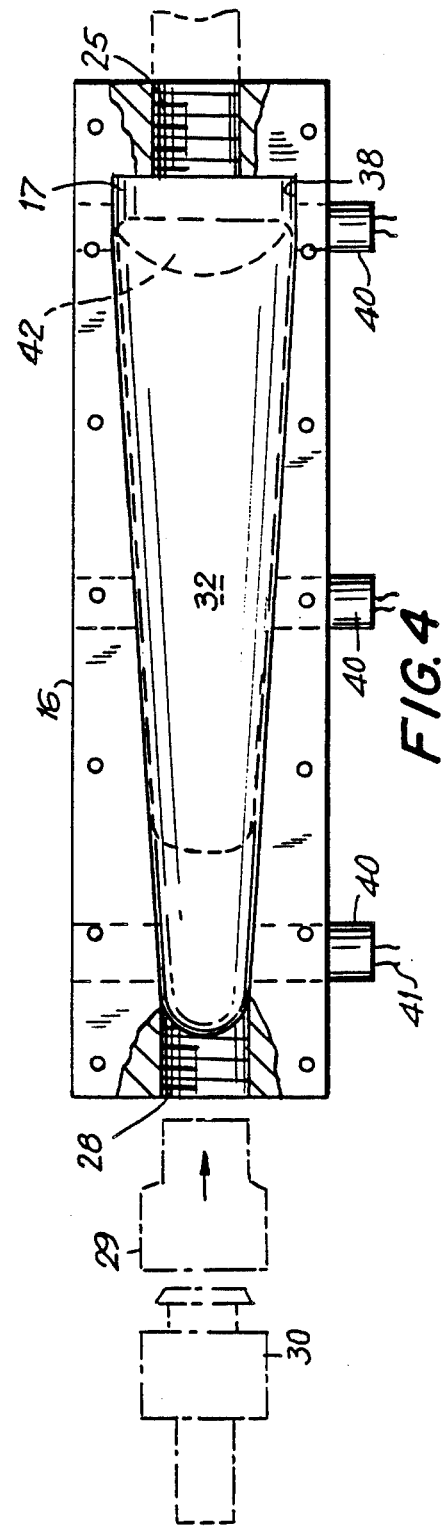
FIG. 4 is a more detailed view from above of the multifilament spreading member shown in FIG. 1 and FIG. 3, in the apparatus vessel means.

Referring now to FIG. 4, there is seen a more detailed view from above of the multifilament/multifiber spreading member 32 positioned within the chamber 17 of vessel means 16. As shown in FIG. 4, the spreading member 32 is closely confined by the interior walls 38 of the vessel means 16 so that passage of the continuous length 22 is restricted to the narrow space above the member 32. Resin 14 also fills this space (of chamber 17) through which the continuous length 22 is traveling toward the outlet 28. The FIG. 4 also shows a plurality of heating rods 40 for heating the vessel means 16 for the purpose of maintaining a melt (thermoplasticity) of the resin 14 within the confines of the vessel means 16. It will be appreciated by those skilled in the art that thermal energy may be applied to any point or points within or along the apparatus 10 to maintain a molten state of thermoplasticity of the polymeric resin contained within the vessel means 16. The heater elements 40 may be any conventional heating means for maintaining the resin at a predetermined melt temperature, including an element thermally energized by a heated fluid including gas or liquid heat transfer mediums. Conveniently, the heater elements 40 are electrically energized resistance heaters, energized by electrical energy (not shown in FIG. 1) by connection thereto through an electrical conductor 41. Thermocouples and temperature sensors may also be associated with the heater means (as is well known in the art) with appropriate circuit interrupters for energizing or de-energizing the heater means 40 so that predetermined and selected temperatures may be maintained. In this way, the temperature of the resin 14 within chamber 17 and within or on the continuous length 22 may be maintained at a range promoting the flow of the resin 14 around the individual filaments or fibers making up the continuous length 22 during its passage through the apparatus 10.

Critical to the apparatus and method of the present invention is the configuration and location of the spreading member 32. Advantageously the spreading member 32 is removeable from within the vessel means 16, as is shown in FIG. 5, for periodic cleaning. The FIG. 5 is a view in perspective of the spreading member 32 and shows it to be an elongate body which may be described as being the nappe of a cone or of a frusto-conical body. The member 26 has a first end 42 which is positioned within the chamber 17 of vessel means 16 at a point adjacent to the layering sleeve 25. A second end 44 occupies a position within the chamber 17 of vessel means 16 adjacent to the outlet 28. A multifilament or multifiber spreading surface 48 constitutes the bulk of the body of member 32 between the ends 42, 44. As shown in the FIG. 5, the member 32 is tapered or bevelled beginning at the first end 42 and descending to terminate at the second end 44. The taper or lengthwise bevel of member 32 holds the continuous length 22 in contact with the surface 48 during passage of the continuous length 22 through the vessel means 16, inducing separation of individual filaments and fibers within the continuous length 22.

Figure 6:
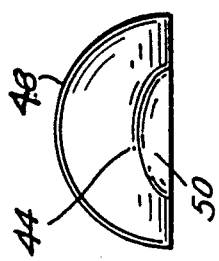
FIG. 6 is an end view of the member shown in FIG. 5.

FIG. 6 is a view of the end 44 not seen in FIG. 5. The squared-off terminus 50 makes the embodiment member 32 shown in FIGS. 5 and 6 to be a nappe of a frusto-conical body. However, a classical cone or like shape may also be utilized, so long as surface 48 is convex as shown.

FIG. 7 is a view as in FIG. 6 but with a section of continuous length 22 passing over the convex surface 48. As shown, the separated and spread apart multifilaments or fibers within the continuous length 22 are brought together and reconsolidated as they pass over the tapered and bevelled terminal end 44 of the spreading member 32. This is due to the shape and configuration of the member 32 together with its relatively close proximity to the sizing die 29 adjacent thereto which ultimately consolidates the impregnated length by consolidating the previously spread multifilaments or multifibers of the continuous length 22 and removing excess resin 14 as it is poltruded in the direction of the arrow. As shown in FIG. 8, a view of the end 42 of the spreading member 32, the filaments or fibers are spread apart by their impingement upon the surface 48 as described previously and shown also in the FIG. 1, during poltrusion in the direction of the arrow.

From the above description it will be appreciated that the shape of the member 32 may be further defined or characterized in part by a first curvilinear line, when the body is viewed in cross section along a plane perpendicular to the legthwise axis of the elongate body. This line has a point on it at a crest or apex between the ends of the line and over which the continuous length 22 is brought into contact. The curvilinear line may be viewed as defining a dome or, more simply, a convex surface for spreading the multifilaments or multifibers of a continuous length of yarn. A second curvilinear line, when the body is viewed in cross section along a plane parallel to the lengthwise axis of the elongate body may be imagined, and has a point on it at the crest or apex between the first and second ends. A generally convex shaped surface is also viewed along this plane of view. This second point also receives an impingement of the continuous length 22 as it traverses chamber 17 of the vessel means 16.

Referring again to FIG. 1, it will be understood that the member 32 is aligned between the inlet 20 and the outlet 28 so that a portion of the multifilament or multifiber spreading surface 48, including the points on the first and second curvilinear lines described above, lies on the predetermined path through which the continuous length 22 is tracted. When tracted under tension, the continuous length 22 exerts a downward force upon the surface 48 of member 32, thereby facilitating and promoting the separation and reconsolidation of the individual filaments and/or fibers of the multifilament or multifiber continuous length 22. This spreading and reconsolidation is essential to the method of the invention.

The following Examples describe the manner and the process of making and using the invention and set forth the best mode contemplated by the inventor for carrying out the invention.

EXAMPLE 1

Apparatus is provided meeting the description of the apparatus 10 shown in the accompanying drawings. The sizing die component has a die orifice of 1.58 mm. A continuous strand of fiberglass yarn (250 yield fiberglass; Hybond 2079, PPG Industries) is threaded through the apparatus. A thermoplastic resin (polycarbonate resin; LEXAN ® 140, General Electric Co.) having an inherent viscosity of 0.5 dl/g is extruded into the container vessel 16 while the yarn is tracted through the apparatus 10 at a speed of 0.5 meters/minute under a tension of circa 10.8 kg. The temperature of the resin extruded is circa 250° C. and is maintained at the same temperature. The flat tape product resin impregnated strand comprises 40% by weight of resin and visual examination with a 10 power magnification does not reveal any resin voids between glass fibers.

What is claimed is:

1. Poltrusion apparatus for impregnating a continuous length of multifilaments or multifibers, which comprises:
   (A.) a thermoplastic polymeric resin extruder;
   (B.) vessel means positioned adjacent to the extruder, for receiving and containing thermoplastically extruded polymeric resin, said vessel means having
      (i) a first inlet for receiving the extruded resin;
      (ii) a second inlet for receiving into contained resin, the continuous length for impregnation; and
      (iii) an outlet for the impregnated continuous length;
   (C.) a sizing die on the vessel means outlet;
   (D.) means adjacent to the sizing die, for tensioning the continuous length and tracting the tensioned continuous length along a predetermined path into the second inlet, through the vessel means, through the outlet and through its sizing die;
   (E.) a multifilament or multifiber spreading member positioned within the vessel means, between the second inlet and the outlet, said member comprising an elongated body having
      (i) a first end distal to the outlet
      (ii) a second end adjacent to the outlet; and
      (iii) a multifilament or multifiber spreading surface between the first and second ends;
   said body also having a taper beginning at the first end and terminating at the second end;
   said body being further defined by a shape characterized in part by
      (i) a first curvilinear line, when the body is viewed in cross-section along a plane perpendicular to the length-wise axis of the elongate body, with a point on the line between the ends of the line;
      (ii) a second curvilinear line, when the body is viewed in cross-section along a plane parallel to the lengthwise axis of the elongate body, with a point on the second line between the first and the second ends;
   said member being aligned between the second inlet and the outlet so that a portion of the multifilament or multifiber spreading surface, including the points on the first and second curvilinear lines, lies on the predetermined path.

2. Apparatus of claim 1 further comprising a shaping die positioned adjacent the sizing die.

3. Apparatus of claim 1 further comprising means for flattening the continuous length, positioned adjacent to the spreading member.

4. Apparatus of claim 3 wherein the means for flattening is adjustable in its position so as to direct the angle and distance of the continuous length prior to its encountering the spreading member.

5. Apparatus of claim 1 wherein the spreading member is of a shape which represents the nappe of a cone or a frusto-cone.

6. Apparatus of claim 1 wherein the spreading surface is convex.

7. Apparatus of claim 1 wherein the spreading member is removable from the vessel means.

8. A method of impregnating a continuous length of a multifilament or a multifiber continuous length, which comprises; providing apparatus which comprises;
(A.) a thermoplastic polymeric resin extruder;
(B.) vessel means positioned adjacent to the extruder, for receiving and containing thermoplastically extruded polymeric resin, said vessel means having
(i) a first inlet for receiving the extruded resin;
(ii) a second inlet for receiving into the contained resin, the continuous length for impregnation; and
(iii) an outlet for the impregnated continuous length;
(C.) a sizing die on the vessel means outlet;
(D.) means adjacent to the sizing die, for tensioning the continuous length and tracting the tensioned continuous length along a predetermined path into the second inlet, through the vessel means, through the outlet and through its sizing die;
(E.) a multifilament or multifiber spreading member positioned within the vessel means, between the second inlet and the outlet, said member comprising an elongate body having
(i) a first end distal to the outlet;
(ii) a second end adjacent to the outlet; and
(iii) a multifilament or multifiber spreading surface between the first and second ends;
said body also having a taper beginning at the first end and terminating at the second end;
said body being further defined by a shape characterized in part by
(i) a first curvilinear line, when the body is viewed in cross-section along a plane perpendicular to the length-wise axis of the elongate body, with a point on the line between the ends of the line;
(ii) a second curvilinear line, when the body is viewed in cross-section along a plane parallel to the lengthwise axis of the elongate body, with a point on the second line between the first and the second ends;
said member being aligned between the second inlet and the outlet so that a portion of the multifilament or multifiber spreading surface, including the points on the first and second curvilinear lines, lies on the predetermined path;
receiving molten resin from the extruder into the vessel means; and poltruding the length on the predetermined pathway through the vessel means of the provided apparatus and in sequence over the spreading surface and through the sizing die.

* * * * *